United States Patent
An et al.

(10) Patent No.: US 9,621,920 B2
(45) Date of Patent: Apr. 11, 2017

(54) METHOD OF THREE-DIMENSIONAL AND MULTIVIEW VIDEO CODING USING A DISPARITY VECTOR

(71) Applicant: HFI INNOVATION INC., Zhubei, Hsinchu County (TW)

(72) Inventors: Jicheng An, Beijing (CN); Yi-Wen Chen, Taichung (TW); Kai Zhang, Beijing (CN); Jian-Liang Lin, Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 287 days.

(21) Appl. No.: 14/582,115

(22) Filed: Dec. 23, 2014

(65) Prior Publication Data

US 2015/0189323 A1   Jul. 2, 2015

Related U.S. Application Data (63) Continuation of application No. PCT/CN2014/070009, filed on Jan. 2, 2014.

(51) Int. Cl.
*H04N 7/12*   (2006.01)
*H04N 15/00*   (2006.01)
(Continued)

(52) U.S. Cl.
CPC ....... *H04N 19/597* (2014.11); *H04N 13/0048* (2013.01); *H04N 19/103* (2014.11);
(Continued)

(58) Field of Classification Search
CPC . H04N 19/597; H04N 19/513; H04N 13/0048
See application file for complete search history.

(56) References Cited

U.S. PATENT DOCUMENTS 8,923,399 B2 * 12/2014 Yang ............... H04N 19/176
375/240.13
2015/0030087 A1 * 1/2015 Chen ............... H04N 13/0048
375/240.27

(Continued)

OTHER PUBLICATIONS

An, J., et al.; "Availability Checking of Temperal Inter-View MV Candidate and VSP Candidate;" Joint Collaborative Team on 3D Video Coding Extension Development of ITU-T SG 16 WP3 and ISO/IEC JTC 1/SC 29/WH 11; Nov. 2013; pp. 1-4.

(Continued)

*Primary Examiner* — Dave Czekaj
*Assistant Examiner* — Tsion B Owens
(74) *Attorney, Agent, or Firm* — McClure, Qualey & Rodack, LLP (57) ABSTRACT

A method and apparatus for a three-dimensional or multi-view video encoding or decoding system are disclosed, where a three-dimensional coding tool relying on a disparity vector are adaptively applied depending on whether the inter-view reference picture pointed by the disparity vector is in the reference list associated with the current slice. The three-dimensional coding tool may correspond to the Inter-View Motion Prediction (IVMP) or View Synthesis Prediction (VSP). If the inter-view reference picture pointed by the DV is not in the current reference list associated with the current slice, the selected three-dimensional coding tool is disabled for the current block. If the inter-view reference picture pointed by the DV is in the current reference list associated with the current slice, the selected three-dimensional coding tool can be applied to the current block.

13 Claims, 4 Drawing Sheets

(51) Int. Cl.
*H04N 19/597* (2014.01)
*H04N 19/513* (2014.01)
*H04N 13/00* (2006.01)
*H04N 19/105* (2014.01)
*H04N 19/139* (2014.01)
*H04N 19/176* (2014.01)
*H04N 19/103* (2014.01)

(52) U.S. Cl.
CPC ......... *H04N 19/105* (2014.11); *H04N 19/139* (2014.11); *H04N 19/176* (2014.11); *H04N 19/513* (2014.11)

(56) References Cited

U.S. PATENT DOCUMENTS

2015/0078450 A1* 3/2015 Chen ................ H04N 19/00769 375/240.16
2015/0189323 A1* 7/2015 An ....................... H04N 19/597 375/240.16
2016/0182884 A1* 6/2016 Lin ..................... H04N 19/597 375/240.03
2016/0295240 A1* 10/2016 Kim ..................... H04N 19/597

OTHER PUBLICATIONS

Zhang, L., et al.; "Control of the Availability of Advanced Inter-View Coding Predictions;" Joint Collaborative Team on 3D Video Coding Extension Development of ITU-T SG 16 WP3 and ISO/IEC JTC 1/SC 29/WH 11; Apr. 2014; pp. 1-8.
Zhang, N., et al.; "3D-CE2-h Related_Bug fix for Issues Caused by Reference View Selection;" Joint Collaborative Team on 3D Video Coding Extension Development of ITU-T SG 16 WP3 and ISO/IEC JTC 1/SC 29/WH 11; Aug. 2013; pp. 1-6.
Tech, G., et al.; "3D-HEVC Draft Text 2;" Joint Collaborative Team on 3D Video Coding Extension Development of ITU-T SG 16 WP3 and ISO/IEC JTC 1/SC 29/WH 11; Nov. 2013; pp. 1-90.

* cited by examiner

Fig. 1

Prior Art

METHOD OF THREE-DIMENSIONAL AND MULTIVIEW VIDEO CODING USING A DISPARITY VECTOR

CROSS REFERENCE TO RELATED APPLICATIONS

The present invention is a continuation-in-part of and claims priority to PCT Patent Application, Ser. No. PCT/CN2014/070009, filed on Jan. 2, 2014, entitled "Existence of Inter-view Reference Picture and Availability of 3DVC Coding Tools". The PCT Patent Application is hereby incorporated by reference in its entirety.

FIELD OF THE INVENTION

The present invention relates to three-dimensional video coding. In particular, the present invention relates to applying a 3D video coding tool depending on whether the inter-view reference picture.

BACKGROUND AND RELATED ART

Three-dimensional (3D) television has been a technology trend in recent years that intends to bring viewers sensational viewing experience. Various technologies have been developed to enable 3D viewing. Among them, the multi-view video is a key technology for 3D TV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, multi-view video coding exploits inter-view redundancy. Various 3D coding tools have been developed or being developed by extending existing video coding standard. For example, there are standard development activities to extend H.264/AVC (advanced video coding) and HEVC (high efficiency video coding) to multi-view video coding (MVC) and 3D coding. The corresponding new standards being developed are referred as 3D-HEVC (High Efficiency Video Coding) or 3D-AVC (Advanced Video Coding) coding respectively. Various 3D coding tools developed or being developed for 3D-HEVC and 3D-AVC are reviewed as follows.

Figure 1:
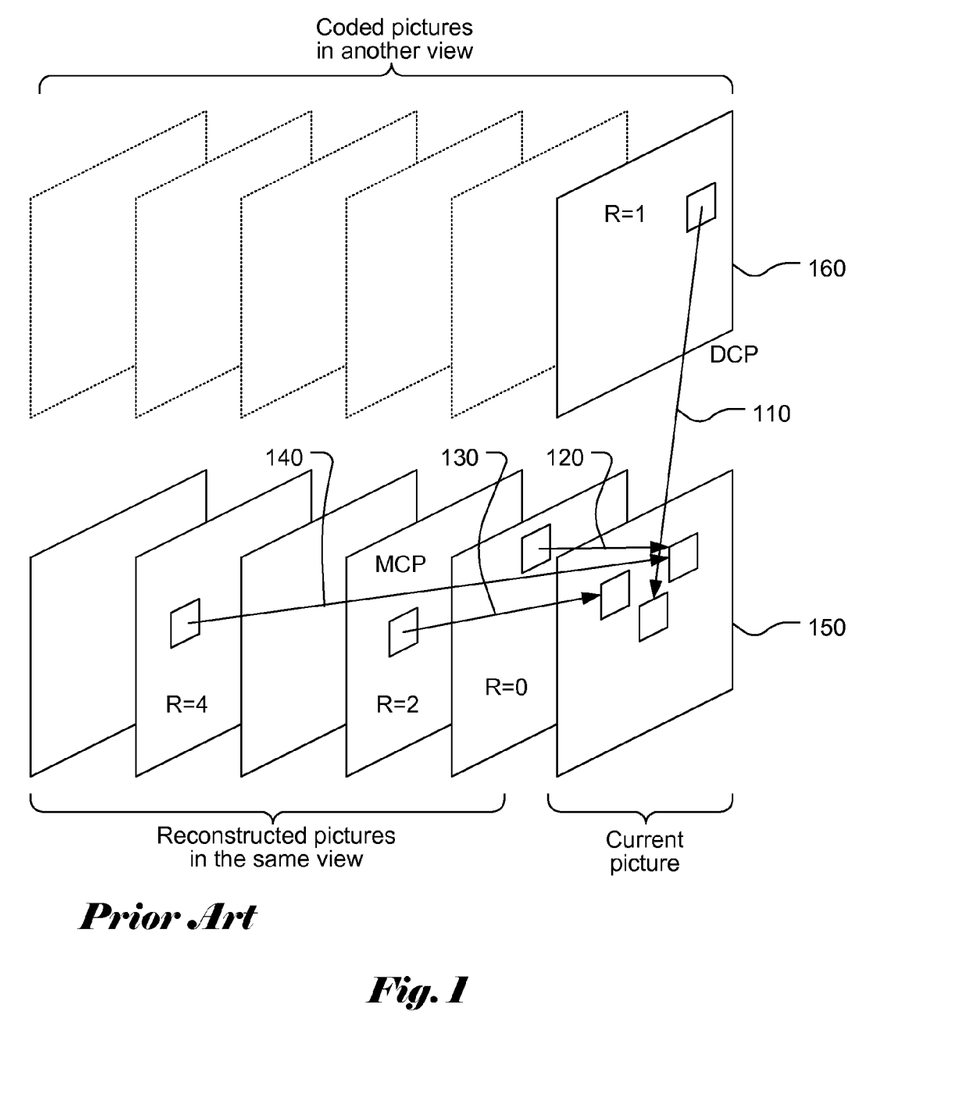
FIG. 1 illustrates an example of three-dimensional video coding incorporating disparity-compensated prediction (DCP) as an alternative to motion-compensated prediction (MCP).

FIG. 1 illustrates an example of 3D video coding system incorporating Disparity-Compensated Prediction (DCP) and motion-compensated prediction (MCP). The vector (110) used for DCP is termed as disparity vector (DV), which is analog to the motion vector (MV) used in MCP. FIG. 1 illustrates three MVs (120, 130 and 140) associated with MCP. Moreover, the DV 110 of a DCP block can also be predicted by the disparity vector predictor (DVP) candidate derived from neighboring blocks or the temporal collocated blocks that also use inter-view reference pictures. The inter-view reference picture (160) may have the same picture order count (POC) as the current picture (150). However, the inter-view reference picture (160) has a difference view index from the current picture (150) since they are in different views.

In the current 3D-HEVC, inter-view motion prediction is used to share the previously encoded motion information of reference views. For deriving candidate motion parameters for a current block in a dependent view, a DV for the current block is derived first, and then the prediction block in the already coded picture in the reference view is located by adding the DV to the location of the current block. If the prediction block is coded using MCP, the associated motion parameters can be used as candidate motion parameters for the current block in the current view. The DV can also be directly used as a candidate DV for DCP.

For the current block, motion vector predictor (MVP)/disparity vector predictor (DVP) can be derived from the inter-view blocks in the inter-view pictures. In the following, inter-view blocks in inter-view picture may be abbreviated as inter-view blocks. The derived candidate is termed as inter-view candidates, which can be inter-view MVPs or DVPs. The coding tools that codes the motion information of a current block (e.g., a current prediction unit, PU) based on previously coded motion information in other views is termed as inter-view motion parameter prediction. Furthermore, a corresponding block in a neighboring view is termed as an inter-view block and the inter-view block is located using the disparity vector derived from the depth information of current block in current picture.

Figure 2:
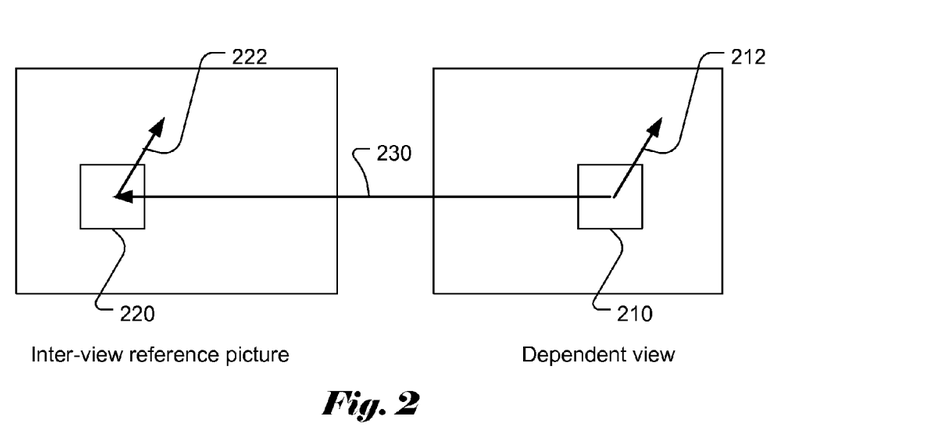
FIG. 2 illustrates an example of temporal inter-view motion prediction that relies on a disparity vector.

FIG. 2 illustrates an example of temporal inter-view motion prediction, where the motion information of a current block (210) in a dependent view is predicted by a corresponding block (220) in an inter-view reference picture. The location of the corresponding block (220) is specified by a disparity vector (230). The motion information (222) of the corresponding block (220) is used to predict motion information (212) of the current block (210) in the current view.

Figure 3:
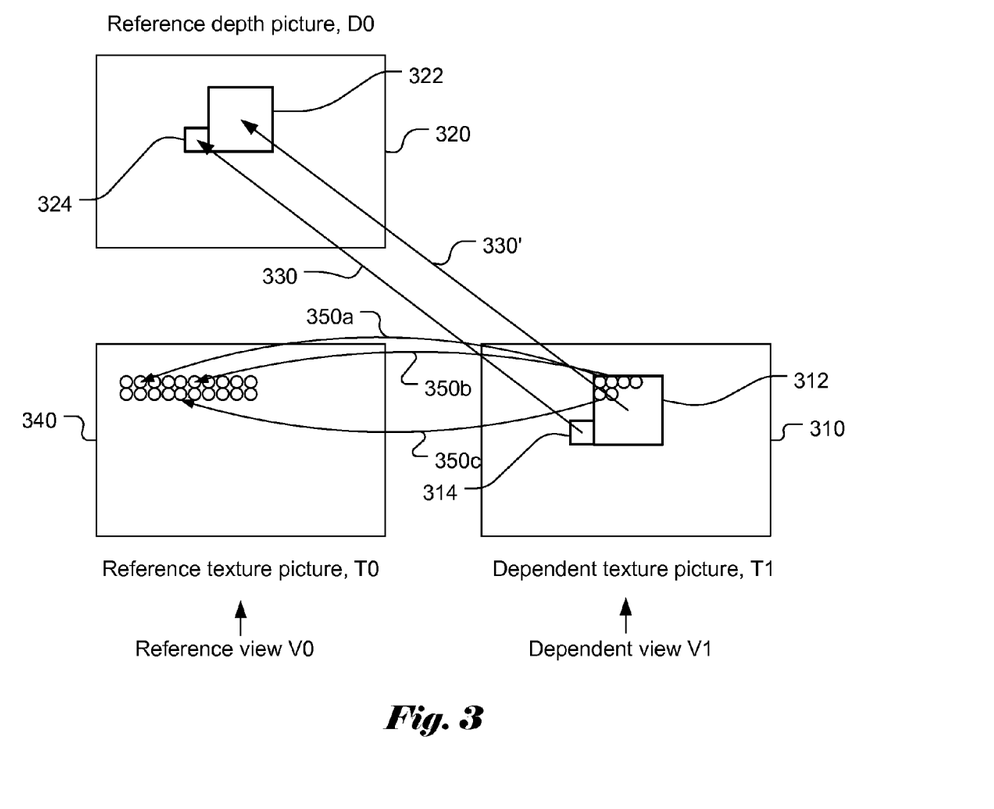
FIG. 3 illustrates an example of view synthesis prediction that relies on a disparity vector.

View Synthesis Prediction (VSP) is a technique to remove inter-view redundancy among video signal from different viewpoints, in which synthetic signal is used as references to predict a current picture. An exemplary VSP process is illustrated in FIG. 3. VSP locates the reconstructed depth data of the reference view and uses it as virtual depth for the current PU. A technique named Neighboring Block Disparity Vector (NBDV) is used to locate the reconstructed depth data. In FIG. 3, a current prediction unit (PU) (312) in a dependent texture picture (310) is being coded. A disparity vector (330) of neighboring block (314) of the current block (312) is identified, where the disparity vector (330) points to a block (324) in the reference depth picture (320). The disparity vector (330') is then used by the current PU (312) to location a corresponding reference depth block (322) in the reference depth picture (320). The reference depth block (322) is used as the virtual depth block for the current PU (312). Prediction signals are then generated according to a disparity vector derived from the virtual depth for each 8×8 partition of the PU. The disparity values derived from the virtual depth block are used to locate corresponding reference samples in the reference texture picture. For example, three samples in the current texture block (312) are mapped to three samples in the reference texture picture (340) according to respective disparity values as indicated by three arrows (350a-c). The mapping process is named backward warping. In addition, the warping operation may be performed at a sub-PU level precision, such as 2×2 or 4×4 blocks.

Figure 4:
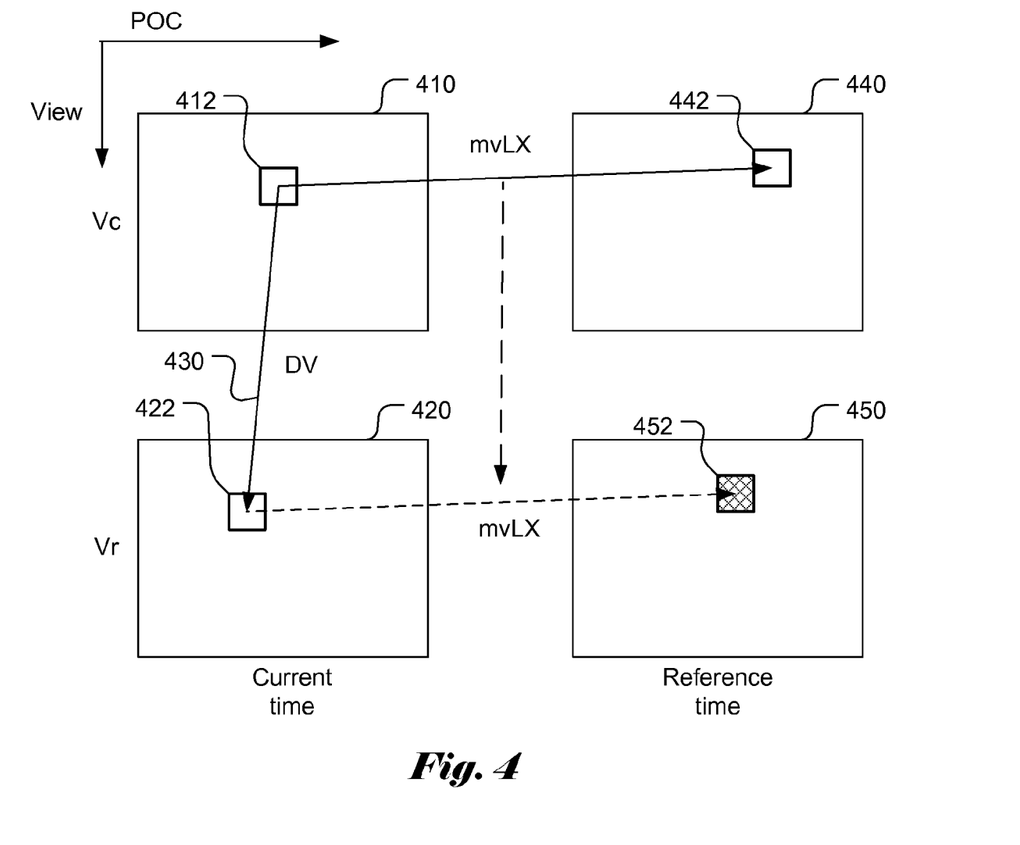
FIG. 4 illustrates an example of advanced residual prediction that relies on a disparity vector.

Advanced residual prediction (ARP) is another 3D coding tool used in current 3D-HEVC test model. FIG. 4 illustrates an example of advanced residual prediction (ARP) according to the current of 3D-HEVC, where the temporal residual signal in a current view is predicted by the temporal residual prediction signal in a reference view. The main procedures of ARP can be described as shown in FIG. 4, where the current prediction unit (PU 412) is a temporal prediction block using motion vector mvLX. Pictures 410 and 440 are in the current view, while pictures 420 and 450 are in the reference view. Pictures 410 and 420 correspond to two pictures with a current frame time, while pictures 440 and 450 correspond to two pictures in a reference frame time. The current block 412 is temporally predicted by temporal reference block 442 in frame 440 using motion vector mvLx. Block 422 is a corresponding block in the reference view for the current block 412. Block 422 is located from the location of block 412 according to disparity vector 430. The same motion vector mvLX is used to locate the temporal reference block (452) in the reference view corresponding to block 422. The reference residual in the reference view between block 452 and block 422 is used to predict the current residual between block 412 and block 442.

In the above 3D coding tools, i.e., IVMP, VSP and ARP, they rely on the inter-view reference picture. If the associated inter-view reference picture is not available, these 3D coding tools will not be performed correctly. Accordingly, it is desirable to develop a method to overcome the issue when the associated inter-view reference picture is not available.

BRIEF SUMMARY OF THE INVENTION

A method and apparatus for a three-dimensional or multi-view video encoding or decoding system are disclosed, where the system checks the validity of inter-view reference picture pointed by a disparity vector (DV) for the Inter-View Motion Prediction (IVMP) or View Synthesis Prediction (VSP) three-dimensional tool relying on the DV. If the inter-view reference picture pointed by the DV is not in the current reference list associated with the current slice, the three-dimensional coding tool or tools will be disabled for the current block. If the inter-view reference picture pointed by the DV is in the current reference list associated with the current slice, the three-dimensional coding tool or tools will be enabled for the current block. The temporal inter-view motion vector candidate is excluded from a Merge candidate list if the inter-view motion prediction is disabled. The view synthesis prediction Merge candidate is excluded from a Merge candidate list if the view synthesis prediction is disabled.

A high-level syntax element can be used to enable or disable one or more three-dimensional coding tools for coding each dependent texture layer or each dependent depth layer. If this high-level syntax element indicates that one or more three-dimensional coding tools are disabled for the dependent texture layer or dependent depth layer, said one or more three-dimensional coding tools will not be applied to data in this dependent texture layer or dependent depth layer. A high-level control flag can be transmitted in a picture level bitstream or a slice level bitstream associated with one picture or one slice to indicate whether one or more three-dimensional coding tools are enabled or not for said one picture or said one slice respectively. If the high-level control flag indicates that one or more three-dimensional coding tools are disabled for the picture or slice, said one or more three-dimensional coding tools will not be applied to the picture or slice. When the high-level control flag is transmitted in the slice level bitstream, the high-level control flag is the same for all slices in said one picture.

The inter-view reference picture may have a same picture order count (POC) as the current block and a different view index from the current block. The DV can be derived based on one or more neighboring blocks of the current block. If the DV is invalid, the inter-view reference picture pointed by the DV is designated as not in the current reference list. The invalidity of the DV can be determined easily, for example, if there is no inter-view reference picture in current reference picture lists associated with current slice, or if the reference view index of the DV has an invalid value, −1, it indicates the DV is unavailable or invalid.

DETAILED DESCRIPTION OF THE INVENTION

As described above, disparity vector (DV) is widely used in various coding tools for three-dimensional video coding system. However, the inter-view reference picture pointed by the derived DV may not be included in the reference picture lists of the current slice. If a three-dimensional (3D) tool relying on such DV, such as IVMP, VSP or ARP is selected, the 3D tool will not be useful since the inter-view reference picture pointed by the derived DV may not be included in the reference picture lists of the current slice. In other words, the sub-PU temporal inter-view motion vector candidate, shifted temporal inter-view motion vector candidate, and the VSP candidate are not inserted into the Merge candidate list when the reference view index of derived DV has an invalid value.

When there is no inter-view picture in both lists 0 and list 1 of the current reference picture, the data associated with the inter-view reference picture pointed by the DV is not valid. The conventional approach simply disregards this fact. Therefore, when the IVMP, VSP or ARP 3D tool is used in this case, the encoding and decoding process will not be performed correctly since the data from the inter-view reference picture is invalid. Accordingly, embodiments according to the present invention checks whether the inter-view reference picture pointed by the DV exists or not. If the inter-view reference picture pointed by the DV is in the reference picture list of the current slice, the data associated with the inter-view reference picture pointed by the DV will be valid and used by the IVMP, VSP or ARP 3D tool. If the inter-view reference picture pointed by the DV does not exist, such as not in the inter-view reference list of the current slice, embodiments according to the present invention will take an alternative path for the IVMP, VSP or ARP 3D tool so as not to use the data associated with the inter-view reference picture pointed by the derived DV.

An example of derivation process for a temporal inter-view motion vector candidate according to the conventional 3D-HEVC is described in "3D-HEVC Draft Text 2" (Joint Collaborative Team on 3D Video Coding Extension Development of ITU-T SG 16 WP 3 and ISO/IEC JTC 1/SC 29/WG 11, 6th Meeting: Geneva, CH, 25 Oct. 1 Nov. 2013, Document: JCT3V-F1001, referred as "JCT3V-F1001" in this application). When a corresponding flag, iv_mv_pred_flag[nuh_layer_id is equal to 1, the IVMP 3D tool is used. Embodiments according to the present invention checks the inter-view reference picture availability for IVMP as indicated by IVMP availability flag, availableFlagLXInterView to determine whether the temporal inter-view motion vector candidate is available. If the temporal inter-view reference motion vector candidate is available, availableFlagLXInterView has a value of 1. Otherwise, availableFlagLXInterView has a value of 0 and variable refIdxLX (i.e., reference picture index for list LX, X=0 or 1) is set equal to −1, and both components of mvLXInterView are set to 0, where mvLXInterView indicates the motion vector of the corresponding inter-view block. When refViewIdx is equal to −1, the whole coding process for derivation of a temporal inter-view motion vector candidate is terminated according to one embodiment of the present invention. In other words, when refViewIdx is equal to −1, the IVMP 3D tool is not used.

The application of a selected 3D coding tool according to the availability of the inter-view reference picture can be applied to a selected dependent texture layer or a selected dependent depth layer selectively. For example, a high-level syntax element can be used to indicate the selected 3D coding tool is enabled or disabled for the selected dependent texture layer or the selected dependent depth layer. If this high-level syntax element indicates that the selected 3D coding tool is enabled for the dependent texture layer or the selected dependent depth layer, the selected 3D tool will be applied to a current block in the selected dependent depth layer if the inter-view reference picture is in the reference list of the current slice. If the inter-view reference picture is not available, the selected 3D coding tool will not be applied to the current block. If this high-level syntax element indicates that the selected 3D coding tool is disabled for the dependent texture layer or the selected dependent depth layer, the selected 3D tool will not be applied to any block in the dependent texture layer or the selected dependent depth layer.

A high-level control flag can be transmitted in a picture or slice level to indicate whether one or more selected 3D coding tools are enabled or not for a picture or slice. If the high-level control flag indicates that a selected 3D coding tool is enabled for the picture or slice, the selected 3D tool will be applied to a current block in the picture or slice if the inter-view reference picture is in the reference list of the current slice. If the inter-view reference picture is not available, the selected 3D coding tool will not be applied to the current block. If the high-level control flag indicates that the selected 3D coding tool is disabled for the picture or slice, the selected 3D tool will not be applied to any block in the picture or slice.

An example of derivation process for a view synthesis prediction Merge candidate according to the conventional 3D-HEVC is described in "JCT3V-F1001". Embodiments according to the present invention determine whether the VSP Merge candidate is available according to VSP availability flag, availableFlagVSP to. If RefViewIdx[ xCb][ yCb] is equal to −1, (i.e., the inter-view reference picture for a block located at (xCb, yCb) is not available), availableFlagVSP is assigned a value of 0 and the whole decoding process for derivation of a view synthesis prediction merge candidate is terminated according to one embodiment of the present invention. In other words, when RefViewIdx[xCb][yCb] is equal to −1, the VSP 3D tool is not used.

The performance of a system incorporating an embodiment of the present invention is compared to that of a conventional system. The system incorporating an embodiment of the present invention checks the validity of inter-view reference picture to disable or enable some 3D tools such as the Inter-View Motion Prediction (IVMP), View Synthesis Prediction (VSP). When the inter-view reference picture is not available, the system incorporating an embodiment of the present invention will disable the IVMP or VSP 3D tool. The conventional system is based on HTM-9.0 (Test Model of 3D video coding based on HEVC, version 9.0), which disregards whether the inter-view reference picture is available or not. Table 1 illustrates the performance comparison conducted under the common test condition (CTC) as defined for HTM, where the inter-view reference picture is always available under CTC. However, it is obvious that the conventional system will encounter issues when the inter-view reference picture is not available. In this case, the conventional system would either incur degraded performance (due to invalid data for IVMP or VSP) or cause unexpected system behavior (due to reasons such as memory fault). The performance comparison is based on different sets of test data listed in the first column. The BD-rate differences are shown for texture pictures in view 1 (video 1) and view 2 (video 2). A negative value in the BD-rate implies that the present invention has a better performance. BD-rate is a well-known performance measurement in the field of video coding. As shown in Table 1, the BD-rate measure for all categories is the same as the conventional HTM-9.0 as anticipated.

TABLE 1

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.0% | 0.0% | 0.0% | 0.0% | 0.0% | 0.0% | 97.5% | 107.8% | 99.4% |
| Kendo | 0.0% | 0.0% | 0.0% | 0.0% | 0.0% | 0.0% | 98.5% | 105.3% | 99.3% |

TABLE 1-continued

|  | Video 0 | Video 1 | Video 2 | Video PSNR/ video bitrate | Video PSNR/ total bitrate | Synth PSNR/ total bitrate | Enc time | Dec time | Ren time |
|---|---|---|---|---|---|---|---|---|---|
| Newspapercc | 0.0% | 0.0% | 0.0% | 0.0% | 0.0% | 0.0% | 100.4% | 107.9% | 105.2% |
| GhostTownFly | 0.0% | 0.0% | 0.0% | 0.0% | 0.0% | 0.0% | 95.3% | 96.0% | 99.3% |
| PoznanHall2 | 0.0% | 0.0% | 0.0% | 0.0% | 0.0% | 0.0% | 97.9% | 97.4% | 104.0% |
| PoznanStreet | 0.0% | 0.0% | 0.0% | 0.0% | 0.0% | 0.0% | 96.9% | 108.9% | 99.1% |
| UndoDancer | 0.0% | 0.0% | 0.0% | 0.0% | 0.0% | 0.0% | 96.9% | 108.1% | 95.3% |
| Shark | 0.0% | 0.0% | 0.0% | 0.0% | 0.0% | 0.0% | 97.7% | 103.8% | 98.4% |
| 1024 × 768 | 0.0% | 0.0% | 0.0% | 0.0% | 0.0% | 0.0% | 98.8% | 107.0% | 101.3% |
| 1920 × 1088 | 0.0% | 0.0% | 0.0% | 0.0% | 0.0% | 0.0% | 96.9% | 102.8% | 99.2% |
| average | 0.0% | 0.0% | 0.0% | 0.0% | 0.0% | 0.0% | 97.6% | 104.4% | 100.0% |

Figure 5:
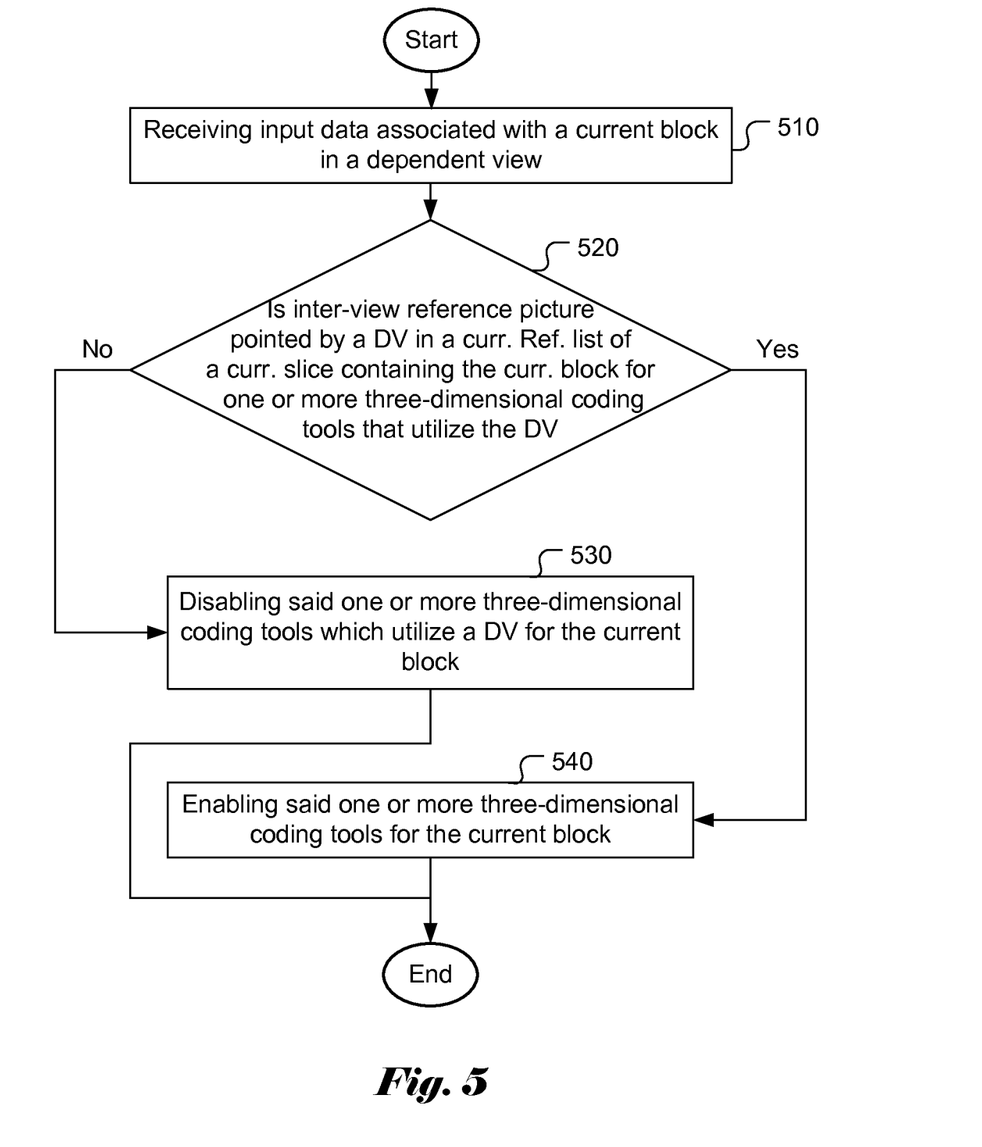
FIG. 5 illustrates an exemplary flowchart of three-dimensional or multi-view video encoding or decoding that checks the validity of the inter-view reference picture and applies a selected three-dimensional coding tool adaptively according to an embodiment of the present invention.

FIG. 5 illustrates an exemplary flowchart of three-dimensional or multi-view video encoding or decoding that checks the validity of the inter-view reference picture according to an embodiment of the present invention. The system receives input data associated with a current block in a dependent view as shown in step 510. The input data may correspond to un-coded or coded texture data. The input data may be retrieved from storage such as a computer memory, buffer (RAM or DRAM) or other media. The input data may also be received from a processor such as a controller, a central processing unit, a digital signal processor or electronic circuits that produce the input data. The inter-view reference picture pointed by a DV is checked to determine whether it is in the current reference list associated with the current slice as shown in step 520, where one or more three-dimensional coding tools utilize the DV. If the result is "Yes", the process goes to step 540 to enable the three-dimensional coding tools for the current block such as constructing the Merge candidate list by inserting the IVMP or VSP candidate. If the result is "No", the process goes to step 530 to disable the three-dimensional coding tool for the current block. For example, the Merge candidate list will not include the IVMP and VSP candidate.

The flowchart shown above is intended to illustrate an example of adaptively applying a three-dimensional coding tool relying on a disparity vector depending on whether the inter-view reference picture pointed by the disparity vector is in the reference list associated with the current slice. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding for a three-dimensional or multi-view video encoding or decoding system, the method comprising:
   receiving input data associated with a current block in a dependent view;
   determining whether an inter-view reference picture pointed by a disparity vector (DV) is in a current reference list associated with a current slice containing the current block for one or more three-dimensional coding tools that utilize the DV;
   if the inter-view reference picture pointed by the DV is not in the current reference list associated with the current slice, disabling said one or more three-dimensional coding tools for the current block; and
   if the inter-view reference picture pointed by the DV is in the current reference list associated with the current block, enabling said one or more three-dimensional coding tools for the current block.

2. The method of claim 1, wherein said one or more three-dimensional coding tools are selected from a group consisting of inter-view motion prediction (IVMP), view synthesis prediction (VSP), or advanced residual prediction (ARP).

3. The method of claim 2, wherein said one or more three-dimensional coding tools correspond to the inter-view motion prediction and a temporal inter-view motion vector candidate is excluded from a Merge candidate list if the inter-view motion prediction is disabled.

4. The method of claim 2, wherein said one or more three-dimensional coding tools correspond to the view synthesis prediction and a view synthesis prediction Merge candidate is excluded from a Merge candidate list if the view synthesis prediction is disabled.

5. The method of claim 1, wherein a high-level syntax element is used to enable or disable said one or more three-dimensional coding tools for coding each dependent texture layer or each dependent depth layer.

6. The method of claim 1, wherein a high-level control flag is transmitted in a picture level bitstream or a slice level bitstream associated with one picture or one slice to indicate whether said one or more three-dimensional coding tools are enabled or not for said one picture or said one slice respectively.

7. The method of claim 6, wherein when the high-level control flag is transmitted in the slice level bitstream, the high-level control flag is the same for all slices in said one picture.

8. The method of claim 1, wherein said determining whether the inter-view reference picture pointed by the DV is in the current reference list associated with the current slice corresponds to determining whether a reference view index of the inter-view reference picture for the current block is invalid.

9. The method of claim 8, wherein the reference view index is invalid if the reference view index has a value of −1.

10. The method of claim 1, wherein the inter-view reference picture has a same picture order count (POC) as the current block and a different view index from the current block.

11. The method of claim 1, wherein the DV is derived based on one or more neighboring blocks of the current block.

12. The method of claim 1, wherein the inter-view reference picture pointed by the DV is designated as not in the current reference list if the DV is unavailable or invalid, or the reference view of the DV is unavailable or invalid.

13. An apparatus for video coding in a three-dimensional or multi-view video encoding or decoding system, the apparatus comprising one or more electronic circuits configured to:
receive input data associated with a current block in a dependent view;
determine whether an inter-view reference picture pointed by a DV is in a current reference list associated with a current slice containing the current block for one or more three-dimensional coding tools that utilize the DV;
if the inter-view reference picture pointed by the DV is not in the current reference list associated with the current slice, disable said one or more three-dimensional coding tools for the current block; and
if the inter-view reference picture pointed by the DV is in the current reference list associated with the current block, enable said one or more three-dimensional coding tools for the current block.

* * * * *